US 8,006,813 B2

(12) United States Patent
James et al.

(10) Patent No.: US 8,006,813 B2
(45) Date of Patent: Aug. 30, 2011

(54) METHOD AND ARRANGEMENT FOR MACHINE COOLING

(75) Inventors: Barry James, Newton Aycliffe (GB);
Peter O'Brien, Sunderland (GB);
Darshan C. Patel, Des Plaines, IL (US)

(73) Assignee: Caterpillar Inc., Peoria, IL (US)

( * ) Notice: Subject to any disclaimer, the term of this patent is extended or adjusted under 35 U.S.C. 154(b) by 898 days.

(21) Appl. No.: 11/984,705

(22) Filed: Nov. 21, 2007

(65) Prior Publication Data
US 2008/0121476 A1 May 29, 2008

(30) Foreign Application Priority Data

Nov. 24, 2006 (EP) .................................. 06124773

(51) Int. Cl.
*F16D 55/02* (2006.01)
(52) U.S. Cl. .................. 188/71.6; 188/264 R
(58) Field of Classification Search ............ 188/71.6, 188/264 R–264 P
See application file for complete search history.

(56) References Cited

U.S. PATENT DOCUMENTS

| | | | |
|---|---|---|---|
| 5,050,710 A | | 9/1991 | Bargfrede |
| 5,215,168 A | * | 6/1993 | Guiot et al. ................ 188/71.6 |
| 7,281,619 B2 | * | 10/2007 | Kuhn ......................... 188/71.6 |
| 2005/0173975 A1 | | 8/2005 | Catalano |

FOREIGN PATENT DOCUMENTS

| | | |
|---|---|---|
| EP | 1350982 | 10/2003 |
| EP | 1561963 | 8/2005 |
| JP | 2002340065 | 11/2002 |
| JP | 2004224509 | 8/2004 |
| JP | 2004224510 | 8/2004 |
| JP | 2005054941 | 3/2005 |
| WO | WO 2005/054026 | 6/2005 |

OTHER PUBLICATIONS

European Search Report and Opinion dated May 3, 2007, for Application No. 06124773.0 (7 pages).

* cited by examiner

*Primary Examiner* — Melanie Torres Williams
(74) *Attorney, Agent, or Firm* — Finnegan, Henderson, Farabow, Garrett & Dunner LLP

(57) ABSTRACT

A method of controlling the temperature of a brake arrangement for a machine is disclosed. The method includes providing a flow of pressurized fluid to the brake arrangement and sensing a first temperature of the fluid downstream of the brake arrangement. The method also includes determining a first temperature range for the brake arrangement and determining if the first sensed temperature falls in the first temperature range. The method also includes requesting an adjustment of at least one fluid parameter of the flow of pressurized fluid in response to determining that the first sensed temperature does not fall within the first temperature range such that the sensed temperature moves to the first temperature range.

21 Claims, 2 Drawing Sheets

METHOD AND ARRANGEMENT FOR MACHINE COOLING

TECHNICAL FIELD

This disclosure relates to machine cooling and, more particularly, to a method and an arrangement for machine cooling.

BACKGROUND

Some types of machines, such as, for example, certain types of articulated dump trucks and telehandlers, have drive axles with integrated wet brake arrangements. In such arrangements, the brake discs run in a bath filled with a fluid, such as an oil, to dissipate heat created during retarding of the machine, and to prolong the general service life of the brake discs. The fluid may be sealed in the axle and replaced at certain service intervals, or alternatively, an intermittent or continuous flow of fluid may take place through the axles.

European Patent Application EP1561963A1 (the '963 application) discloses a method for controlling a flow of fluid that is aimed at preventing an excessive build up of pressure in a brake arrangement. By driving a set of pumps via a fixed flow pump and a splitter valve and controlling the flow through the brake arrangement based on pressure data collected from the brake arrangement, the system prevents over-pressurization of the brake arrangement. However, the system is complicated, utilizing a significant number of pumps, motors and valves, and the system does not address accurate control of the temperature of the brakes. Furthermore, the system of the '963 application provides for a constant flow from the pump, resulting in significant parasitic power loss and fuel consumption.

The disclosed method and arrangement for machine cooling are directed toward improvements in the existing technology.

SUMMARY OF THE DISCLOSURE

One aspect of the disclosure relates to a method of controlling the temperature of a brake arrangement for a machine. The method includes providing a flow of pressurized fluid to the brake arrangement and sensing a first temperature of the fluid downstream of the brake arrangement. The method also includes determining a first temperature range for the brake arrangement and determining if the first sensed temperature falls in the first temperature range. The method also includes requesting an adjustment of at least one fluid parameter of the flow of pressurized fluid in response to determining that the first sensed temperature does not fall within the first temperature range such that the sensed temperature moves to the first temperature range.

In another aspect, the disclosure relates to a brake temperature control arrangement for a machine having a brake arrangement, a source of pressurized fluid, a system valve for distributing pressurized fluid from the fluid source to the brake arrangement, and a first temperature sensor configured to sense a first temperature indicative of a temperature of the brake arrangement. The arrangement further includes an electronic control unit configured to receive temperature data from the first temperature sensor and to compare the temperature data with at least one stored value indicative of a first temperature range, the electronic control unit further configured to enable adjustment of the temperature of the brake arrangement by adjusting at least one parameter of the pressurized fluid if the sensed first temperature does not fall within the first temperature range.

Other features and aspects of this disclosure will be apparent from the following description and the accompanying drawings.

DETAILED DESCRIPTION

Figure 1:
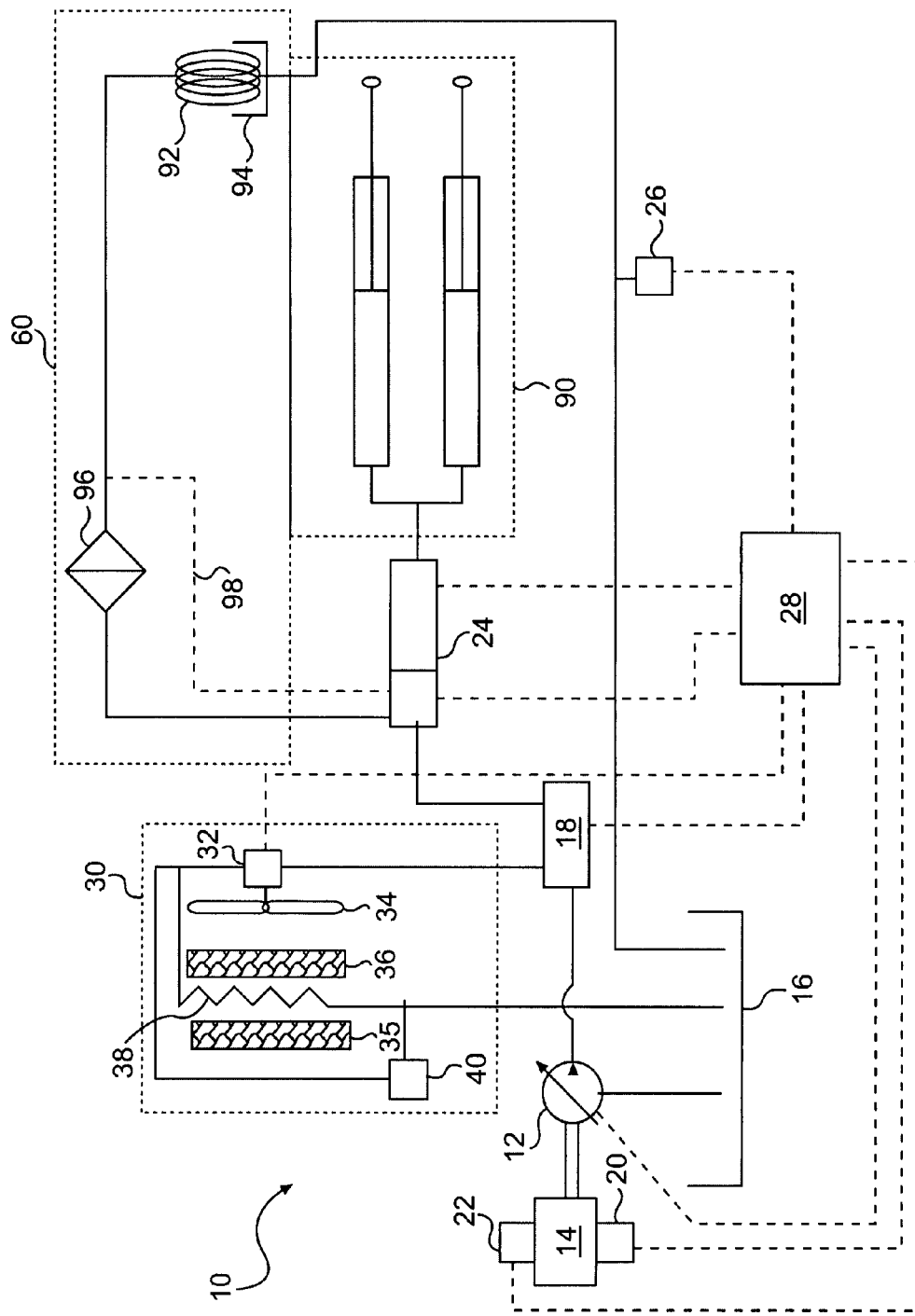
FIG. 1 is a diagrammatic illustration of an exemplary disclosed cooling arrangement.

Now referring to FIG. 1, a brake temperature control arrangement generally designated as 10 is shown as an exemplary embodiment of the current disclosure. The brake temperature control arrangement 10 includes a pump 12, which may be any type of pump or it may be a plurality of pumps working together to provide fluid to various portions of the brake temperature control arrangement 10. In one embodiment, the pump 12 may be a variable displacement pump driven by a power source 14, and a variable fluid output may be provided by adjusting a swash angle of the pump 12, by varying the speed of the power source 14, or by a combination of both. The pump 12 may draw a fluid, such as, for example, an oil, or more specifically a hydraulic oil, from a reservoir 16, and may pump the pressurized fluid to a first valve 18. This first valve 18 may be a system valve and may distribute fluid towards various machine systems, such as steering and brake operation (both not shown), etc. One such system that will be discussed in more detail is a cooling portion generally designated as portion 30.

It is to be understood that the cooling portion 30 may include more or fewer components and is designated as such for clarity purposes only. The cooling portion 30 may include a motor 32 such as a fluid driven variable displacement motor wherein the rotational speed of the variable displacement motor may be dependent on the volume of fluid it receives, the swash angle of the motor, or a combination of both. The motor 32 may also be of any other suitable kind or type, such as, for example, an electric motor. The motor 32 may drive a fan 34 for pulling or pushing air through or over at least one or more heat exchangers, such as an intercooler 35, an engine coolant radiator 36, and a fluid cooler 38. The fan 34 is typically a variable speed fan. The fluid cooler 38 may be configured to cool the fluid provided by the pump 12 and used to drive the motor 32. The fluid may then be returned to the reservoir 16 such that the temperature of the bulk fluid may be influenced. It is to be understood that more or fewer heat exchangers may be used and that the type of heat exchanger may also be chosen as preferred. A by-pass arrangement 40 may be provided to allow fluid to by-pass the heat exchanger 38 to allow the fluid to warm up rapidly and to protect the heat exchanger from over-pressurization.

In one embodiment the power source 14 may be an internal combustion engine and may be provided with at least two sensors 20 and 22. An engine coolant used to control the temperature of the internal combustion engine may be directed to the engine coolant radiator 36 if cooling may be deemed necessary, and the sensor 20 may be used to monitor the temperature of the engine coolant (T2). The internal combustion engine may be a turbocharged and intercooled engine wherein the intake air may be first compressed by a turbocharger (not shown) and subsequently fed through the intercooler 35 to lower the temperature of the intake air. The sensor 22 may be a temperature sensor in the inlet manifold for sensing the temperature of the intake air (T3).

The system valve 18 may also direct a portion of the fluid as displaced by the pump 12 to the control valve 24. The control valve 24 may be an on-demand control valve (ODCV) and may control the flow to both a brake arrangement 60 and a machine function portion 90. The flow to either of the brake arrangement 60 and the machine function portion 90 may be triggered by an operator or system command. The control valve 24 may also be a priority valve for prioritizing flow to the machine function portion 90 over the brake arrangement 60 or vice versa. The control valve 24 may also reduce the pressure of the fluid directed to the brake arrangement 60 as the pressure generated by the pump 12 may, due to the various system demands, be higher than the maximum operating pressure of the brake arrangement 60.

In one embodiment the brake temperature control arrangement 10 may be applied to a dump truck. Such a machine has a loading platform that may be raised to tip the load of the platform, and the machine function portion 90 may be a hoisting arrangement for raising and lowering the platform. At least a portion of the control valve 24 may then be regarded as a hoist valve.

In one embodiment the brake arrangement may be a brake arrangement as used with a drive axle of a machine (not shown). At least a portion of the brake arrangement may be sealed within the axle and may include a wet disc brake arrangement 92 having multiple brake discs at least partially immersed in a fluid bath 94. The fluid may be the same as the one stored in the reservoir 16. The brake arrangement 60 may further include a heat exchanger 96 which may use engine coolant to either cool or heat the fluid flowing from the control valve 24 to the fluid bath 94.

Downstream of the fluid bath 94 and the wet disc brake arrangement 92 there may be provided a sensor 26. Downstream in this context may also include a position at or near the brake arrangement 60. The sensor 26 may be a temperature sensor for sensing the temperature of the fluid leaving the fluid bath 94 and the wet disc brake arrangement 92. The sensor 26 is preferably arranged in such a manner that it senses the temperature of fluid leaving the fluid bath 94 and the wet disc brake arrangement 92 in a direct manner such that the temperature T1 corresponds closely to the temperature of the fluid bath 94 and the wet disc brake arrangement 92. Sensing just this temperature may contribute to increasing the chance of accurately determining the temperature of the fluid leaving these components and hence the temperature of the components themselves.

In one exemplary embodiment, the return flow from the fluid bath 94 and the wet disc brake arrangement 92 may be combined with another return flow. However, if the influence of external factors on the temperature of the return flow is kept to a minimum, a better temperature control of the fluid bath 94 and the wet disc brake arrangement 92 may be possible.

To enable the sensor 26 to sense the temperature of the fluid bath 94 and the wet disc brake arrangement 92 continuously even when the control valve 24 prevents a flow of fluid to the brake arrangement 60, the sensing feed line 98 allows a small continuous flow of fluid through the fluid bath 94 and the wet disc brake arrangement 92 to the sensor 26.

In one embodiment an electronic control unit (ECU) 28 may be provided and configured to receive the signals from the sensors 20, 22 and 26. The ECU 28 may also be configured to control and alter the swash angles of the pump 14 and the motor 32. The ECU 28 may also be configured to control the control valve 24 so as to alter the flow to the brake arrangement 60, prioritize the flow to the machine function portion 90 over the brake arrangement 60, or vice versa.

INDUSTRIAL APPLICABILITY

The method and brake temperature control arrangement as disclosed may be useful for a wide range of applications, such as, for example, for industrial machines such as dump trucks, telehandlers, and the like.

Figure 2:
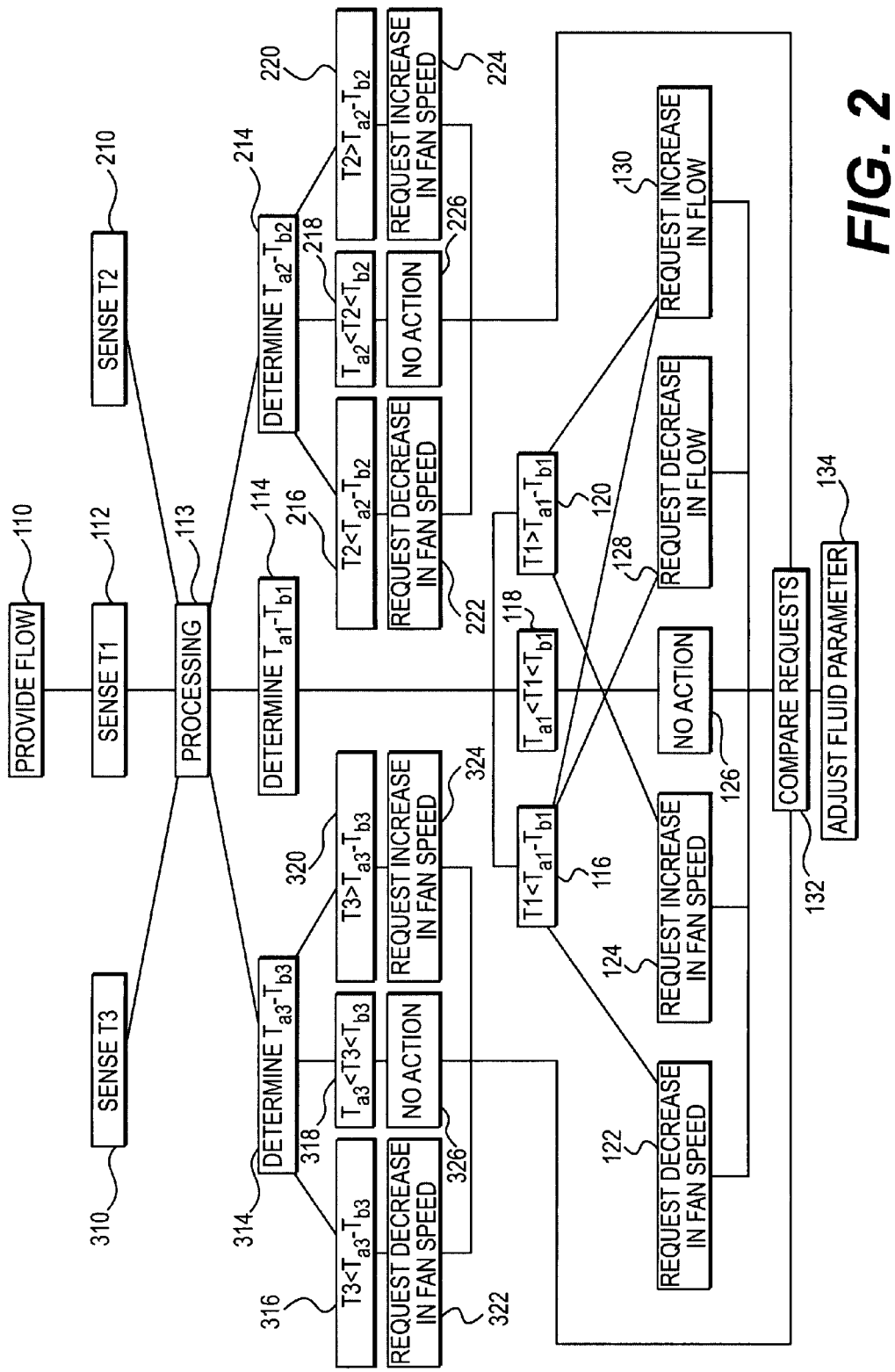
FIG. 2 is an exemplary flowchart for a method of temperature control corresponding to the cooling arrangement of FIG. 1.

Referring to FIG. 2, it is to be understood that the flowchart is to be interpreted for exemplary purposes only. The steps as shown may, for example, be performed in any suitable order, certain steps may be performed repeatedly, and steps may be delayed and skipped altogether if preferred.

A first step 110 may be to provide a flow of fluid using a suitable arrangement such as a pump 12. Via the system valve 18, the fluid may be distributed to the cooling arrangement 30, the control valve 24 and any other systems that may require fluid. In step 112, a temperature downstream of the fluid bath 94 and the wet disc brake arrangement 92, hereinafter designated as T1, may be sensed by sensor 26 and a signal indicative of this temperature may be sent to the ECU 28 for processing in step 113. At step 114 a first temperature range $(T_{a1}-T_{b1})$ may be determined for the brake arrangement 60, which may, for example, be a preferred range, an optimum range, or an allowable range. This determination may include retrieving data previously stored in the ECU 28. At steps 116-120 the ECU 28 may determine if T1 falls within $T_{a1}-T_{b1}$, or is outside the boundaries. If T1 falls within $T_{a1}-T_{b1}$, no action may be taken as shown in step 126. If T1 is outside the boundaries of $T_{a1}-T_{b1}$, an adjustment of a fluid parameter may be requested.

In one embodiment, the available range of fluid parameter adjustment may include increasing fan speed, decreasing fan speed, increasing flow rate, decreasing flow rate, and any suitable combination thereof.

If the conditions $T_{a1}<T1<T_{b1}$ is fulfilled no action may be taken as the temperature is within the first range.

If $T1<T_{a1}-T_{b1}$, i.e., the fluid temperature T1 sensed by the sensor 26 is below the first range, several fluid parameter adjustments may be requested. First, a decrease in fan speed may be requested as shown in step 122. A decrease in fan speed may reduce the cooling effect of the cooling air on the heat exchangers 35, 36 and 38, hence the fluid may not be cooled or may be cooled to a lesser degree. Also, due to heat dissipation from the brake temperature control arrangement 10, the fluid may warm up. Second, a decrease in flow rate through the fluid bath 94 and the wet disc brake arrangement 92 may be requested as shown in step 128. If the fluid is having a cooling effect on the fluid bath 94 and the wet disc brake arrangement 92, a reduction of fluid flow may allow the fluid bath 94 and the wet disc brake arrangement 92 to warm up, which will then translate into a higher T1. Third, an increase in flow rate through the fluid bath 94 and the wet disc brake arrangement 92 may be requested as shown in step 130. If, for example, the temperature of the fluid flowing towards the fluid bath 94 and the wet disc brake arrangement 92 is higher than the temperature of the fluid bath 94 and the wet disc brake arrangement 92, the fluid may actually warm up the fluid bath 94 and the wet disc brake arrangement 92. In this situation an increase in flow may warm up the fluid bath 94 and the wet disc brake arrangement 92 more rapidly. Fourth, a combination of the above adjustments may be possible, for example, a decrease in fan speed and a decrease in flow rate may be requested simultaneously.

If $T1>T_{a1}-T_{b1}$, i.e., the temperature T1 measured by the sensor 26 is too high, the following actions may be requested.

First, an increase in flow rate through the fluid bath 94 and the wet disc brake arrangement 92 may be requested as shown in step 130. Such increase in flow rate may increase the cooling effect and hence the temperature T1 sensed by the sensor 26 may drop over time. Second, an increase in speed of the fan 34 may be requested as shown in step 124. An increase in speed of the fan 34 may increase the cooling of the fluid flowing through the fluid cooler 38. The fluid leaving the fluid cooler 38 may then reduce the temperature of the bulk fluid in the reservoir 16. This in turn may affect the cooling performance of the fluid when the fluid is pumped through the fluid bath 94 and the wet disc brake arrangement 92. Again, both an increase in speed of the fan 34 and an increase in flow rate through the fluid bath 94 and the wet disc brake arrangement 92 may be requested simultaneously if preferred.

The steps 314-326 regarding the engine coolant temperature and the steps 214-226 for the air intake temperature may be regarded as similar to the steps 114-126. Like numerals have like functions or considerations attached. It is to be understood however that the processes for T1, T2 and T3 need not be identical. Any suitable individual variation may be made as preferred. In one embodiment, the steps 210 and 310 may be taken simultaneously or sequentially to the above steps and in the steps 210 and 310 the air intake temperature T2 (step 210) and the engine coolant temperature T3 (step 310) may be sensed. The signals representing the sensed values may then be sent to the ECU 28 for processing in step 113 and the subsequent processes may be conducted in a similar manner as described for T1 as shown in steps 214-226 and 314-326 in FIG. 2. Hence, at step 214, a second temperature range ($T_{a2}$-$T_{b2}$) is determined for the air intake temperature T2, which may for example be a preferred range, an optimum range, or an allowable range. At steps 216-220, the ECU 28 evaluates the air intake temperature T2 by determining if T2 falls within the range $T_{a2}$-$T_{b2}$. If T2<$T_{a2}$-$T_{b2}$, a fan speed decrease may be requested in step 222. If T2>$T_{a2}$-$T_{b2}$, a fan speed increase may be requested in step 224. If T2 is in the range of $T_{a2}$-$T_{b2}$, a fan speed no action may be requested in step 226.

Similarly, at step 314, a third temperature range ($T_{a3}$-$T_{b3}$) is determined for the engine coolant temperature T3, which may, for example, be a preferred range, an optimum range, or an allowable range. At steps 316-320, the ECU 28 evaluates the engine coolant temperature T3 by determining if T3 falls within the range $T_{a3}$-$T_{b3}$. If T3<$T_{a3}$-$T_{b3}$, a fan speed decrease may be requested in step 322. If T3>$T_{a3}$-$T_{b3}$, a fan speed increase may be requested in step 324. If T3 is in the range of $T_{a3}$-$T_{b3}$, a fan speed no action may be requested in step 226.

All requests for fluid parameter adjustment may be considered by the ECU 28 in step 132. The ECU 28 may in response make a number of fluid parameter adjustments including various combinations thereof to move any of T1, T2 and T3 to their respective first, second, and third ranges. If all of the conditions $T_{a1}$<T1<$T_{b1}$, $T_{a2}$<T2<$T_{b2}$ and $T_{a3}$<T3<$T_{b3}$ are fulfilled, no action may be taken as all three temperatures are within their respective first, second, and third range. This cycle of the process may then end with step 132 wherein the ECU 28 decides upon comparing all requests that no adjustment of a fluid parameter may be required.

During operation it may be possible that the evaluations of T1, T2, and T3 result in conflicting requests, i.e., simultaneous requests for no action and one for an increase in flow. The ECU 28 may therefore evaluate all requests and weigh the importance of each or prioritize the various requests. If it is determined that one request may be critical, this request may be regarded as being an overriding request and may be the one that is executed. For example in a situation wherein T1<$T_{a1}$-$T_{b1}$ and T2>$T_{a2}$-$T_{b2}$, the ECU 28 may receive requests for a decrease in fan speed via step 122, a request for a decrease in flow via step 128, and a request for an increase in fan speed via step 224. In such a conflicting set of requests the ECU 28 may decide that decreasing T2 may be more critical than T1, and may adjust a fluid parameter via step 134 by increasing the fan speed. Of course, the ECU 28 may still allow a decrease in flow in accordance with step 128.

Any of the above processes may run cyclically and a repeated cycle may be started from any suitable starting point in the process. It is to be understood that a variety of decisions may be made by the ECU 28 and that the ECU 28 may be programmed differently depending on factors such as system design, machine type, individual component requirements, external factors, ambient operating conditions, etc.

Although some embodiments have been described herein, it will be apparent to those skilled in the art that various modifications and variations can be made to the disclosed method and arrangement for machine cooling without departing from the scope of the disclosure. Other embodiments will be apparent to those skilled in the art from consideration of the specification and practice of the disclosed embodiments. It is intended that the specification and examples be considered as exemplary only with the true scope of protection being indicated by the following claims.

The invention claimed is:

1. A method of controlling the temperature of a brake arrangement for a machine, the method comprising:
    providing a flow of pressurized fluid to the brake arrangement;
    sensing a first temperature of the fluid downstream of the brake arrangement;
    determining a first temperature range for the brake arrangement;
    determining if the first sensed temperature falls in the first temperature range;
    sensing a second temperature corresponding to a temperature of engine coolant in an engine or engine intake air;
    determining a second temperature range for the engine coolant or the engine intake air;
    determining if the second sensed temperature falls in the second temperature range;
    receiving conflicting requests for an adjustment of at least one fluid parameter of the flow of pressurized fluid, the engine coolant, or the engine intake air in response to determining if the first and second sensed temperatures fall in the respective first and second temperature ranges; and
    determining an adjustment of the at least one fluid parameter based on which one of the conflicting requests has higher priority.

2. The method according to claim 1, wherein determining the adjustment of at least one fluid parameter includes determining either an increase or a decrease in flow rate of the flow of pressurized fluid to the brake arrangement.

3. The method according to claim 1, wherein the machine further includes a cooling portion including a variable speed cooling fan configured for cooling at least one of the engine coolant, the engine intake air, or the flow of pressurized fluid, wherein determining the adjustment of at least one fluid parameter includes determining an adjustment of the temperature of the engine coolant, the engine intake air, or the flow of pressurized fluid to the brake arrangement by changing the speed of the cooling fan.

4. The method according to claim 1, wherein the cooling portion further includes a fluid cooler and a by-pass arrangement configured for allowing at least a portion of the flow of pressurized fluid to by-pass the fluid cooler, wherein determining the adjustment of at least one fluid parameter includes determining an adjustment of the temperature of the flow of pressurized fluid to the brake arrangement by at least partially opening or closing the by-pass arrangement.

5. The method according to claim 3, wherein the conflicting requests includes:
   a first request for an increase in speed of the variable speed cooling fan in response to determining that one of the first sensed temperature of the second sensed temperature does not fall within the corresponding first or second temperature range; and
   a second request for a decreased in speed of the variable speed cooling fan in response to determining that the other one of the first sensed temperature or the second sensed temperature does not fall within the corresponding first or second temperature range.

6. The method according to claim 3, wherein:
   the conflicting request include at least two of: a) a request for an adjustment of at least one fluid parameter in response to determining that the first sensed temperature does not fall within the first temperature range, b) a request for a change in speed of the variable speed cooling fan in response to determining that the second sensed temperature corresponding to the temperature of the engine coolant in the engine does not fall within the second temperature range, and c) a request for a change in speed of the variable speed cooling fan in response to determining that a third sensed temperature corresponding to the temperature of the engine intake air does not fall within a third temperature range; and
   the method further includes performing at least one adjustment or change corresponding to the request having highest priority.

7. The method according to claim 3, wherein:
   the conflicting request include: a) a request for an adjustment of at least one fluid parameter in response to determining that the first sensed temperature does not fall within the first temperature range, b) a request for a change in speed of the variable speed cooling fan in response to determining that the second sensed temperature corresponding to the temperature of the engine coolant in the engine does not fall within the second temperature range, and c) a request for a change in speed of the variable speed cooling fan in response to determining that a third sensed temperature corresponding to the temperature of the engine intake air does not fall within a third temperature range; and
   the method further includes performing an adjustment or change corresponding to the request having highest priority.

8. The method according to claim 1, wherein:
   the second sensed temperature corresponds to the temperature of engine coolant in the engine; and
   the cooling portion is further configured to cool engine coolant in the engine and intake air of the engine; and
   the method further includes:
      sensing a third temperature corresponding to the temperature of the engine intake air;
      determining a third temperature range for the engine intake air; and
      determining if the third sensed temperature falls in the third temperature range; and
   wherein the conflicting requests are received in response to determining if the first, second, and third sensed temperatures fall in the respective first, second, and third temperatures ranges; and
   wherein the adjustment of the at least one fluid parameter is determined based on which one of the conflicting requests has higher priority.

9. The method according to claim 1, wherein providing a flow of pressurized fluid to the brake arrangement includes operating a variable displacement pump for providing a variable flow of pressurized fluid to a control valve; and
   controlling the control valve to regulate the pressurized fluid flow to the brake arrangement.

10. The method according to claim 9, wherein the method further includes prioritizing the flow of pressurized fluid via the control valve such that either the brake arrangement or another machine function has a higher priority.

11. The method according to claim 1, wherein at least a portion of the pressurized fluid flows continuously through the brake arrangement.

12. A brake temperature control arrangement for a machine comprising:
   a brake arrangement;
   a source of pressurized fluid;
   a system valve for distributing pressurized fluid from the fluid source to the brake arrangement;
   a first temperature sensor configured to sense a first temperature indicative of a temperature of the brake arrangement;
   a second temperature sensor configured to sense a second temperature indicative of a temperature of engine coolant in an engine or engine intake air; and
   an electronic control unit configured to:
      receive first temperature data from the first temperature sensor,
      compare the first temperature data with at least one stored value indicative of a first temperature range,
      receive second temperature data from the second temperature sensor,
      compare the second temperature data with at least one stored value indicative of a second temperature range,
      receive conflicting requests for an adjustment of at least one parameter of the pressurized fluid, the engine coolant, or the engine intake in response to the respective comparisons associated with the first temperature data and the second temperature data, and
      adjust the at least one parameter based on which one of the conflicting requests has higher priority.

13. The brake temperature control arrangement according to claim 12, wherein the system valve is configured to be controlled by the electronic control unit, and is configured to adjust the at least one parameter of the pressurized fluid by adjusting the amount of pressurized fluid flowing to the brake arrangement.

14. The brake temperature control arrangement according to claim 12, further including a cooling portion, wherein the cooling portion includes a variable speed cooling fan, the variable speed cooling fan being controlled by the electronic control unit and being configured to adjust the at least one parameter by adjusting the speed of the cooling fan.

15. The brake temperature control arrangement according to claim 14, wherein:
   the cooling portion further includes a first heat exchanger for cooling the engine coolant, the second temperature being indicative of the temperature of the engine coolant; and
   the electronic control unit is further configured to adjust the temperature of engine coolant by adjusting the speed of the cooling fan based on which one of the conflicting requests has higher priority.

16. The brake temperature control arrangement according to claim 14, wherein:
   the cooling portion further includes a heat exchanger for cooling engine intake air, and the second temperature being indicative of the temperature of the engine intake air; and
   the electronic control unit is further configured to adjust the temperature of the engine intake air by adjusting the speed of the cooling fan based on which one of the conflicting request has higher priority.

17. The brake temperature control arrangement according to claim 15, wherein:
   the cooling portion further includes a second heat exchanger for cooling engine intake air; and
   the electronic control unit is further configured to:
   receive third temperature data from a third temperature sensor,
   compare the third temperature data with at least one stored value indicative of a third temperature range,
   receive conflicting requests for the adjustment of the at least one parameter of the pressurized fluid, the engine coolant, or the engine intake air in response to the respective comparisons associated with the first, second, and third temperature data, and
   adjust the at least one parameter by adjusting at least one of the amount of pressurized fluid flowing the brake arrangement and the speed of the cooling fan to move at least one of the first, second and third sensed temperatures to its respective first, second or third temperature range.

18. The brake temperature control arrangement according to claim 12, wherein the arrangement further includes a control valve controlled by the electronic control unit, the control valve being configured to divert at least a portion of the fluid that is flowing substantially towards the brake arrangement away from the brake arrangement if a machine function command is received by the electronic control unit.

19. The brake temperature control arrangement according to claim 12, further including a variable displacement pump adapted for providing a variable flow of pressurized fluid to the brake temperature control arrangement.

20. The brake temperature control arrangement according to claim 12, wherein the first temperature sensor is located in a flow flowing substantially away from the brake arrangement.

21. A machine comprising a brake temperature control arrangement, the brake temperature control arrangement including:
   a brake arrangement;
   a source of pressurized fluid;
   a system valve for distributing pressurized fluid from the fluid source to the brake arrangement;
   a first temperature sensor configured to sense a first temperature indicative of a temperature of the brake arrangement;
   a second temperature sensor configured to sense a second temperature indicative of a temperature of engine coolant in an engine or engine intake air; and
   an electronic control unit configured to:
   receive first temperature data from the first temperature sensor,
   compare the first temperature data with at least one stored value indicative of a first temperature range,
   receive second temperature data from the second temperature sensor,
   compare the second temperature data with at least one stored value indicative of a second temperature range,
   receive conflicting requests for an adjustment of at least one parameter of the pressurized fluid, the engine coolant, or the engine intake air in response to the respective comparisons associated with the first temperature data and the second temperature data, and
   adjust the at least one parameter based on which one of the conflicting requests has higher priority.

* * * * *